Dec. 24, 1946.  G. J. MANSON  2,413,239
PLASTIC COMPOSITION OF POLYVINYL ESTER AND WAX
Filed April 19, 1944
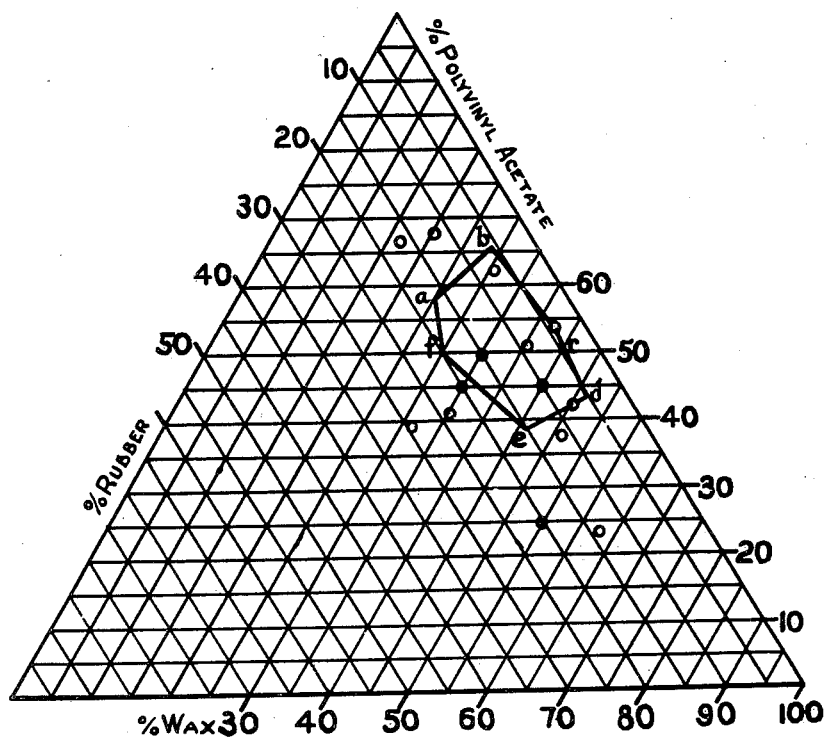
INVENTOR
GEORGE J. MANSON
By
ATTORNEY Patented Dec. 24, 1946

2,413,239

UNITED STATES PATENT OFFICE 2,413,239

PLASTIC COMPOSITION OF POLYVINYL ESTER AND WAX

George James Manson, Ottawa, Ontario, Canada, assignor to Shawinigan Chemicals Limited, Montreal, Quebec, Canada, a corporation of Canada Application April 19, 1944, Serial No. 531,825

16 Claims. (Cl. 260—4)

This invention relates to a plastic composition of which the principal constituents are a polyvinyl ester resin, a wax and a rubbery substance. This application is a continuation-in-part of application Serial No. 407,904.

OBJECTS

Principal objects of the invention are to provide, plastic compositions embodying as essential constituents a polyvinyl ester resin, wax and a rubbery substance, these essential constituents appearing as an intimate homogeneous mixture; compositions of this nature adapted to contain other constituents such as plasticizers, conditioning agents, fillers and so on; compositions of this nature suitable for chewing gum bases.

THE NEW COMPOSITION

The utility of polyvinyl ester resins, such as for example polyvinyl acetate, as a constituent of a plastic composition has been recognized, but the field of their usefulness as such has been restricted owing to their being regarded as generally incompatible with wax. The applicant has, however, discovered that this incompatibility may be overcome by the use in the polyvinyl ester resin-wax mixture of a limited amount of a rubbery substance selected from the group consisting of Hevea rubber and "Butyl" rubber (a rubbery co-polymer of a major amount of isobutylene and a minor amount of isoprene). There may also be incorporated other constituents such as conditioning agents, plasticizers, extending agents and fillers, permitting the production of compositions adapted for a variety of industrial purposes including chewing gum bases, coatings and films.

It will be understood that the nature and concentrations of the constituents may vary quite widely within the scope of the invention to provide a range of products having different characteristics as will become clear from the following. The resin content is generally within the range from about 10% to about 80% by weight of the composition. The wax content is an amount normally incompatible with the resin and generally within the range from about 10% to about 65% by weight of the composition. The content of the rubbery substance is an amount less than that of either of the other essential constituents and effective to render the resin and wax compatible and within the range from about 2% to about 25% by weight of the composition. It is also desirable to include a non-toxic plasticizer for the polyvinyl ester within the range from about 5% to about 25% by weight of the composition, a non-toxic oil softener for the rubber up to about 6% by weight of the composition, and a non-toxic filler up to about 40% by weight of the composition. The homogeneous mixture of the constituents is formed, preferably, according to the invention, by admixing at a softening temperature within the range from about 120° C. to about 170° C. the wax with a rubbery substance, then adding the polyvinyl acetate to the resulting mass and mixing it at a softening temperature within the range from about 120° C. to about 170° C. until it becomes homogeneous. It is desirable to add a rubber plasticizing agent to the rubber-wax mixture and to add the resin with a plasticizer. The filler, and any other constituents employed are generally added after the essential constituents have been blended as aforesaid.

POLYVINYL ESTER

Various polyvinyl esters may be employed such as the acetate, butyrate, propionate and caproate. Mixtures of these esters may also be employed. Polyvinyl acetate is the preferred ester on account of its ready availability and its physical characteristics as applied to principal uses of the present invention. The amount of polyvinyl ester employed ranges in general from about 10% to about 80% of the total mixture whereas that of other esters will be similar, but yield softer products as the molecular weight of the ester increases.

The viscosity of the resin may also vary. For instance, polyvinyl acetate may be employed ranging in viscosity from about 1 to about 25 centipoises. Employable viscosities will, of course, depend upon the desired characteristics of the composition, i. e., the use to which the material is put. Permissible viscosities will also vary in accordance with other constituents of the composition such as for instance, plasticizers, conditioning agents, etc., which serve to render the compositions more plastic and consequently allow higher viscosities to be employed to achieve substantially similar plasticities. This will be better understood as the description proceeds.

THE WAX

The wax constituent may also vary in nature, for instance, paraffins, candelilla wax, beeswax and carnauba wax may all be suitably employed. Paraffin waxes are preferred owing to their ready availability and inherently suitable characteristics for the uses of the present invention. Therefore, it is convenient to consider the use of wax in this invention in terms of paraffin. The melting point of the paraffin may range from between about 110° F. to about 140° F. Although this constant is not considered critical as far as compatibility is concerned, the melting point exerts its influence on the properties of the mix.

The concentration of wax preferred according to the present invention is in the range of about 10% to about 65% by weight of the total composition. The most desirable concentrations within this range will vary, of course, according to the nature of the wax and according to the results desired.

THE RUBBER

The blending agent is "Hevea" natural rubber or Butyl synthetic rubber or their natural or synthetic equivalents for the purposes of the present invention; or mixtures thereof. The rubber must be clean and in a suitable condition for solution in the hot wax. The concentration may vary considerably. In general the range employable is between about 2% and about 25% of the total composition. Usually, it is preferable to keep the rubber within the low portion of this range since it is used principally as a blending agent for the body constituents of the composition, the polyvinyl ester and wax. Where Butyl rubber is employed the lower concentration is somewhat higher than for natural rubber, usually upwards from about 6%.

OTHER CONSTITUENTS

PLASTICIZERS

It is preferable to employ a plasticizer for the polyvinyl ester and this may range in concentration from 0 to about 25% by weight of the composition. An oil softener for the rubber is also useful and this constituent may range from 0 to about 6%.

FILLERS

Fillers of various types are also an advantage in compositions for certain uses and these may range from 0 to about 40% depending upon the characteristics desired.

GENERAL

Other constituents than those named, such as for instance, conditioning agents may also be added as will be clear to one skilled in the art.

It will also be evident that changes in proportion of one constituent may change the characteristics of the composition and also will change the proportions of the other constituents. However, the instructions given for the manufacture of various types of compositions are believed sufficiently explicit for one skilled in the art to achieve the desired results.

The compositions described are useful for a variety of purposes including coatings and films. For example, typical specific compositions suitable for a film or hot melt coating for fiber sheets are as follows.

Table I

| Constituent | Parts by weight | Parts by weight | Parts by weight |
| --- | --- | --- | --- |
| Polyvinyl acetate (viscosity 2.5) | 50 | 60 | 25 |
| Paraffin (M. P. 118-135° F.) | 35 | 15 | 55 |
| Unvulcanized pale crepe rubber | 15 | 15 | 20 |
| Plasticizer | 0 | 10 | 0 |

Films so made will give a high resistance to the passage of moisture, and if a high percentage of polyvinyl acetate is included will be very resistant to the passage of grease. The amount of plasticizer used will depend on the viscosity of the polyvinyl acetate, and will be influenced by the type of coating desired. With the high amount of plasticizer the composition may be used as an adhesive to bind sheets of material together, the composite sheet being thereby made water-resistant and grease-resistant.

CHEWING GUM BASES

Certain of the compositions according to the invention have exceptional utility as chewing gum bases. For this reason, an elaboration on the specific aspects of the invention as applied to chewing gum bases will be of advantage and will also serve to indicate how the plastic compositions in general may be modified by the variation of the mixtures and amounts of the constituents.

RESIN

Polyvinyl acetates are especially useful bodies in chewing gum bases. They are capable of being plasticized by water and the introduction of this water is hastened by the use of soluble sugars and/or conditioning agents such as for instance, propylene glycol or glycerine. Polyvinyl acetates are made in low viscosity grades which become chewable when plasticized in this manner. They do not decompose or depolymerize readily, that is, under the conditions of mixing the chewing gum base, they are free from offensive taste or the danger of forming toxic substances during manufacture. They are themselves tasteless, clean and pure. They may be used with a number of readily available non-toxic plasticizers. They are obtainable in different viscosity grades making it possible to fit the requirements of the individual manufacturers as regards chewability by only changing the grade of polyvinyl acetate used in the formula. They are made from readily available domestic materials, they are not subject to customs duty and do not suffer from fluctuations in quality and price.

In connection with plastic compositions in general, different viscosities of these resins may be employed so as to achieve a variety of results as regards the placticity of the finished composition.

The available range is somewhat more critical as applied to chewing gum base use which embraces such subtle characteristics as chewability, texture, life, pull, flavour retention and others. The applicant has found it preferable to use for chewing gum, bases polyvinyl acetate of viscosities ranging from about 1.5 centipoises to about 10 centipoises. The lowest viscosities when suitably blended with wax according to the teachings of this invention, form a good base with substantially a minimum plasticizer content. When resins of higher viscosities are used the compositions become tougher and it is essential to adjust them by using more plasticizer.

For chewing gum bases, the concentration of polyvinyl acetate in the mix may vary considerably. In general, it may range between about 10% and about 40% by weight and even up to about 60%, especially with the lowest viscosity resins, but is preferably between about 25% and about 35% by weight. This concentration is, of course, influenced by; the viscosity of the particular resin employed, the results desired in terms of the physical characteristics of the end product, the nature and amounts of other agents present, and so on. For one instance, as the plasticizer is increased the percentage of all other components drops. Generally, when the amount of polyvinyl acetate is increased there must be a proportionate increase in plasticizer, in order to maintain a similar chew. Accordingly, good bases may be obtained when using relatively high viscosity polyvinyl acetates by increasing the amount of plasticizer or by reducing the amount of polyvinyl acetate, the other constituents being unchanged in amount. In a standard mix using 7 centipoise polyvinyl acetate and where only the amount of polyvinyl acetate is varied: at around 34 parts polyvinyl acetate the base is tough to chew, the pull is fair and the elasticity is considerable, but as the resin content is dropped, the chew becomes progressively softer, the pull becomes longer and the elasticity decreases so that at around 10 parts the chew is quite soft, the pull very long and the elasticity has practically disappeared.

For other polyvinyl esters the ranges are similar, within the limits of difference in physical properties of these esters and may, from the figures given for polyvinyl acetate, be determined by experiment. Such esters as the formate which yield toxic products on hydrolysis are, of course, not desirable for chewing gum.

Comparable qualitative results are achieved by varying the content of a low viscosity polyvinyl acetate, for instance, of about 1.5 centipoises. As the polyvinyl acetate is increased from about 34 parts to about 65 parts the chew remains very very soft but the pull changes from short to long and the elasticity remains low. Between about 65 parts and about 150 parts the chew changes from very very soft to slightly tough, the pull increases to very long and there is a slight increase in elasticity. Above 85 parts of polyvinyl acetate the chew becomes unpleasantly hard to start. It should be noted that as the proportion of polyvinyl acetate in the mix is increased from about 34 to about 150 parts the actual percentage of plasticizer would be reduced from about 12% to about 5.6%. An adjustment could, therefore, be made by increasing the amount of plasticizer and adding conditioning agents so that the higher ranges would start more readily.

Maximum and minimum amounts for each grade of polyvinyl acetate to give a good chew may be considered approximately as follows:

|  | Maximum | Minimum |
| --- | --- | --- |
|  | Per cent | Per cent |
| Viscosity 1.5 | About 56 | About 27 |
| Viscosity 2.5 | About 51 | About 25 |
| Viscosity 4 | About 43 | About 20 |
| Viscosity 7 | About 33 | About 13 |
| Viscosity 10 | About 25 | About 10 |

PLASTICIZERS

A plasticizer is preferably employed and for most chewing gum uses is essential, although with the lower viscosity polyvinyl esters the amounts used may be substantially the minimum. The plasticizer effective for the present use must be non-toxic and the amounts employed must be insufficient to impart offensive odour or taste to the composition. They must, of course, be effective with the polyvinyl ester with which they are employed. Suitable plasticizers are dibutyl phthalate, butyl phthalyl butyl glycollate, triethylene glycol di-2-ethylbutyrate, or triethylene glycol di-2-ethylhexoate. A suitable concentration must be employed to achieve a desired plasticity. In general it may range from between about 5% and about 25% with about 10% to about 15% preferred.

Where the amount of resin is kept substantially the same and the plasticizer varied, the results are as follows. At about 7% dibutylphthalate in a standard mix, using a 7 centipoise polyvinyl acetate, the chew is very tough, the pull is short and the elasticity great. Progressively, as the plasticizer content is increased, the chew becomes softer, the pull longer and the elasticity is only gradually reduced. It must be remembered, however, that at the higher plasticizer contents, there is the likelihood of the plasticizer introducing its own taste to the composition so that this is a bar to the use of large amounts. Moreover, it is usually preferable to employ as much resin as possible owing to the higher cost of the plasticizer.

Although not essential, it is preferable to employ a plasticizer for the rubber. Any edible oil plasticizer compatible with rubber and the wax may be used. Paraffin oil is preferred and may be that known commercially as Paraffin oil, Russian oil, "Stanolax" or "Nujol." Plasticizers for the rubber may be employed at concetnrations of up to about 10% of the base by weight and preferably up to about 5%. With Butyl rubber, a rubber plasticizer is desirable since the use of this material in the same amounts as natural rubber tends to make the mix more viscous. For instance, about 15 parts of Butyl rubber in a variation of the standard mix of Example 3C makes the mix about as viscous as a similar mix containing rubber at about 25 parts. By increasing the paraffin oil content to about 7.5 parts, the Butyl rubber in the mix may be increased to about 25 parts and is not markedly different from the above mix with about 15 parts of Butyl rubber.

WAX

The characteristics of a wax for use in compositions of the present invention are as follows. It must be non-toxic and available in a grade sufficiently free from offensive taste or it must be such that its taste can be effectively masked. It must be essentially solid at room temperature. It must dissolve rubber. The wax-rubber solution must mix with the polyvinyl acetate and plasticizer. The melting point should not be too high to give a good chew, that is, usually less than about 150° F. is preferred. The composition of different lots should be uniform.

There are many waxes which satisfy these criteria such as for example, candelilla wax, carnauba, beeswax and paraffins. The applicant prefers to use for chewing gum, paraffin waxes having a melting point of between about 120° F. and about 130° F. Here again the concentration may vary from about 10% to about 45% by weight. Below 10% the wax does not impart sufficient of its characteristics, e. g. smoothness to the base, and above 45% the mix tends to become waxy in character and may become incompatible with the resin. The preferred range of concentration is between about 15% and about 30%. These ranges are, of course, dependent in some measure upon the particular nature of the wax and upon the nature of gum desired. Generally speaking, the higher the melting point of the wax, the tougher the composition, other factors being held constant and the same wax employed in relation to polyvinyl acetate.

In a standard mix where about 34 parts of 4 centipoise polyvinyl acetate are provided and the paraffin wax content is varied, the results are somewhat as follows. At about 10% wax the chew is meduim, the pull is very long and there is some elasticity. As the wax content is varied from about 10% of the base to about 40%, the chew, elasticity and pull characteristics remain essentially unchanged. It should be mentioned that as paraffin wax dissolves rubber more readily than most of the other waxes it is to be preferred. However, these other waxes may be employed and also mixtures of different waxes.

RUBBER

The rubber blending agent must be sufficiently soluble in the wax and it must be effective to render the wax and resin compatible at normally incompatible concentrations. It should be low in taste and should not develop toxic impurities at temperatures up to about 150° C. The applicant has found that natural rubber from Hevea latex and Butyl rubber are unique in these respects. Preferably the applicant employs No. 1 pale crepe, but other grades of washed crepe rubber or equivalent materials, for the purposes of this invention, from natural latices are satisfactory. Of the synthetic rubbers, the applicant preferably employs Butyl rubber substantially free from toxic anti-oxidants, catalysts, pigments or materials with an unpleasant taste, or its equivalent, for the purposes of this invention. Mixtures of different suitable rubbers may also be employed. The rubber should be in such a form that it is readily soluble in the wax, for example, as a thin sheet or as powder. If it is too thick, it is extremely difficult to avoid a residue of partly dissolved pellets remaining as hard lumps in the mass. For chewing gum use the amount by weight of natural rubber may vary from about 2% to about 25% with about 3% to about 10% preferred. The amount of Butyl rubber may vary from about 6% to about 25% with about 8% to about 12% preferred. Butyl rubber makes the mix more viscous than does natural rubber but the viscosity can be reduced by the use of a rubber softener, as for instance, paraffin oil.

An increase in the rubber content within the ranges specified has very little effect on the pull, but gives progressively increasing elasticity and toughness of chew to the mixture and makes mixing increasingly difficult. For the purposes of the present invention it is desirable to keep the amounts low since the rubber is used essentially as a blending agent. Surprisingly, even small amounts such as about 2 parts or about 3 parts are effective in rendering compatible the two otherwise incompatible constituents, the resin and the wax.

FILLER

Fillers employable must be finely ground, inert in the mixture, non-toxic, tasteless, and of hardness not higher than that of the tooth enamel so as to avoid its abrasion. It must also be capable of being chewed in the mouth without becoming crumbly as is characteristic of some unsuitable fillers. Precipitated chalk is preferable for the bulk of the filler but the iron oxides and charcoal may be used in amounts sufficient to colour the mix. Mixtures of fillers may also be employed. The amounts of filler may vary, for instance, chalk can be used from about 6% up to about 37% but above this point it renders the base somewhat dry and of inferior texture. The preferred range is from about 15% to about 33. Moreover, over-loading with filler has the disadvantage of lowering the amount of sugar the base can carry.

It is essential that the filler be dry in order to obtain proper dispersion. Any pigments or colouring matter such as iron oxides or charcoal are considered as part of the filler content for the purpose of the examples. The quantities of such colouring matters are small, in the order of about 0.1% to about 1% of the base, and are subject to the same qualifications as the filler.

CONDITIONING AGENTS

The conditioning agents are water-soluble hydroscopic substances used to aid in taking up moisture when the mass is chewed. These agents must be low in taste, non-toxic, of low volatility and compatible with the polyvinyl acetate in the amounts used. Glycerine and propylene glycol are suitable. These conditioning agents are optional and may be employed at concentrations up to about 15% by weight of the base but preferably at less than about 10%.

PROPERTIES OF BASE

The chewing gum compositions according to the invention have many valuable properties. For instance, their general characteristics such as chewability, pull and elasticity may be varied within wide limits to suit the demands of the trade. They have good aging qualities, they are capable of high flavour retention and of taking up large volumes of sugar without becoming unduly hard. Many other advantages will occur to one skilled in the chewing gum art.

MANUFACTURE

The manufacture of the product is not complex. It is, however, important that a proper solution be made of the rubber and the wax plus rubber plasticizing agent at a temperature ranging from about 120° C. to about 170° C. The resulting mixture should be homogeneous and free from undissolved particles. The polyvinyl acetate and plasticizer for the resin are then added within about the same range of temperature. The filler and pigments are added last and mixed at a temperature ranging from about 110° C. to about 120° C. The process may be varied in order of addition of the constituents.

In the case of plastic compositions made from the higher viscosity grades of polyvinyl ester resins it will be found preferable to mix the resin with its plasticizer separately at about 140° C. in a kneader type mixer until the mass is uniform. This mass may then be added to the rubber-wax-oil solution prepared as described above or vice versa. The other components may be added as before.

Stearic acid if used (e. g. Example 8) should be incorporated with the mix after wax-rubber-resin-filler mixture is made at a temperature around 110° C. Water if used in lieu of resin plasticizers should be mixed into the finished compound in a kneader type mixer at temperatures below about 100° C.

EXAMPLES

In order that the invention may be understood in more detail, various embodiments are illustrated in the following examples. These examples are intended as explanatory only and not as limiting to the scope of the invention.

EXAMPLE 1

The following is a typical chewing gum base composition (A) wherein a polyvinyl acetate of an intermediate viscosity for the purpose of the present invention is employed.

| | A, parts by weight |
|---|---|
| Polyvinyl acetate (viscosity about 7 centipoises) | 23.3 |
| Paraffin wax (melting point about 124° F.) | 31.4 |
| Rubber (Hevea) | 7 |
| Paraffin oil | 2.9 |
| Dibutyl phthalate | 13.9 |
| Chalk | 21.5 |

This composition has excellent chewing properties, the chewability being characterized as medium. The pull is very long and the composition very elastic.

EXAMPLE 2

The following demonstrates a typical chewing gum base composition (B) in which a polyvinyl acetate of low viscosity for the present purposes was employed.

| | B, grams |
|---|---|
| Polyvinyl acetate (viscosity 1.5 centipoises) | 55 |
| Rubber (No. 1 pale crepe) | 6 |
| Liquid paraffin | 2.5 |
| Dibutyl phthalate | 12 |
| Paraffin wax | 27 |
| Precipitated chalk | 18.5 |

This composition has excellent chewing properties. The chew might be characterized as being very very soft, the pull fair. The composition exhibits some elasticity.

EXAMPLE 3

The following demonstrates two typical compositions (C and D) one employing a large amount of polyvinyl acetate and the other employing a relatively small amount of polyvinyl acetate.

| Constituents | C | D |
|---|---|---|
| | Parts by weight | Parts by weight |
| Polyvinyl acetate (viscosity 7 centipoises) | 34 | 13.2 |
| Paraffin wax | 27 | 35.5 |
| Rubber (Hevea) | 6 | 7.9 |
| Paraffin oil | 2.5 | 3.3 |
| Dibutyl phthalate | 12 | 15.8 |
| Precipitated chalk | 18.5 | 24.3 |

Both compositions exhibit chewing properties within the range demanded by the trade. Composition C is tough to chew, the pull is fair and elasticity very great. Composition D is soft to chew, the pull is very long and it has practically no elasticity.

EXAMPLE 4

The following are two compositions including high and low plasticizer content respectively.

| Constituent | E | F |
|---|---|---|
| | Parts by weight | Parts by weight |
| Polyvinyl acetate (viscosity about 7 centipoises) | 36.2 | 32 |
| Paraffin wax | 28.7 | 25.4 |
| Rubber (Hevea) | 6.4 | 5.7 |
| Paraffin oil | 2.7 | 2.4 |
| Chalk | 19.7 | 17.5 |
| Dibutyl phthalate | 6.4 | 17 |

Both compositions meet trade requirements. With composition E the chew is very tough, the pull short and elasticity very marked. With composition F the chew is medium tough, the pull is long and the composition very elastic.

EXAMPLE 5

The following compositions demonstrate high and low wax content.

| Constituents | G | H |
|---|---|---|
| | Grams | Grams |
| Polyvinyl acetate (viscosity about 4 centipoises) | 34 | 34 |
| Rubber (No. 1 pale crepe) | 6 | 6 |
| Liquid paraffin | 2.5 | 2.5 |
| Dibutyl phthalate | 12 | 12 |
| Paraffin wax (melting point 124° F.) | 10 | 40 |
| Precipitated chalk | 18.5 | 18.5 |

In the case of composition G the chew is medium, the pull very long and the elasticity slight. In the case of composition H, the chew is medium, the pull long and the elasticity medium. Both bases have properties acceptable to the trade.

EXAMPLE 6

Compositions are made similarly to G and H but using other waxes than paraffin at the same concentrations. A composition embodying candelilla or carnauba wax is somewhat tougher but beeswax is found to make little difference in the chew. In the case of all these waxes the pull is better with the lower amounts of wax. In the case of carnauba, the pull is greatly affected by temperature and the gum stiffens quickly when removed from the mouth. The elasticity is substantially normal with all the waxes with the exception of the composition embodying the higher amount of beeswax which shows practically no elasticity.

EXAMPLE 7

The following example demonstrates compositions embodying high and low rubber contents:

| Constituent | I | J |
|---|---|---|
| | Grams | Grams |
| 4 centipoise polyvinyl acetate | 34 | 34 |
| Rubber (No. 1 pale crepe) | 2 | 25 |
| Liquid paraffin | 2.5 | 2.5 |
| Dibutyl phthalate | 12 | 12 |
| Paraffin wax (melting point 124° F.) | 27 | 27 |
| Precipitated chalk | 18.5 | 18.5 |

In mix I the rubber is just sufficient to hold the resin. The chew is medium, the pull very long and the elasticity considerable. In mix J the rubber wax solution is extremely viscous but mixes with the other components to give a base having a medium chew, very long pull and great elasticity.

EXAMPLE 8

This example illustrates compositions suitable for making a semi-transparent film or coating suitable for packaging and other purposes.

| Constituent | L | M |
|---|---|---|
| Rubber (Hevea) | 23.5 grams | 10 grams. |
| Paraffin wax (melting point 130° C.) | 35.3 grams | 45 grams. |
| 6 centipoise polyvinyl acetate | 41.1 grams | 45 grams. |
| Stearic acid | 10 grams | 10 grams. |
| Water | | 5% to 50% (by weight on the above). |

Sample L represents a mixture suitable for hot melt coating. It has very low moisture vapour permeability and good grease resistance. It does not block or stick together at room or moderate temperatures. Sample M illustrates a composition suitable for forming as a film. The flexibility is controlled by the amount of water used which acts as a plasticizer for the resin. This sample also exhibits great resistance to the passage of moisture vapour and is highly grease resistant.

Plasticizers for the rubber or resin, pigment, fillers or dyes may be added if desired.

EXAMPLE 9

A pellet or stick of formulated chewing gum is coated with the composition L of Example 8 to give a moisture vapor proof coating. This coating preserves the moisture content, flavour and greatly improves the ageing characteristics of the chewing gum.

This is also applicable to other types of confections, fruits, etc.

EXAMPLE 10

This example illustrates the manufacture of a chewing gum base employing Butyl rubber as the blending agent. The amounts are parts by weight.

| Constituent | N | O | P |
|---|---|---|---|
| Butyl rubber | 6 | 15 | 25 |
| Parowax M. P. 124° F | 27 | 27 | 27 |
| Paraffin oil | 2.5 | 2.5 | 2.5 |
| Polyvinyl acetate (viscosity 4 centipoises) | 34 | 34 | 34 |
| Dibutyl phthalate | 12 | 12 | 12 |
| Chalk | 18 | 18 | 18 |

These compositions all had excellent chewing characteristics. In each case, the mix was more viscous for the amount of Butyl rubber present than a similar mix containing Hevea rubber. For instance, the mix O containing 15 parts of Butyl rubber compares closely in viscosity with a similar mix containing 25 parts of natural rubber.

The composition of the various examples with respect to the essential constituents as defined herein, namely polyvinyl ester resin, wax and rubber, is conveniently seen on the drawing, Figure 1, where the examples are shown as small circles. The composition data of the examples is also shown in the table below, the composition of Table 1 being designated Q, R, S, respectively.

| Example | Polyvinyl ester | Wax | Rubber |
|---|---|---|---|
|  | Per cent | Per cent | Per cent |
| 3D | 23.3 | 62.8 | 13.9 |
| S | 25 | 55 | 20 |
| 1A | 37.8 | 50.9 | 11.3 |
| 7J and 10P | 39.5 | 31.4 | 29.1 |
| 8L | 41.2 | 35.3 | 23.5 |
| 5H | 42.5 | 50.0 | 7.5 |
| 10O | 44.8 | 35.5 | 19.7 |
| 8M | 45 | 45 | 10 |
| Q | 50 | 35 | 15 |
| 3C, 4E, 4F, and 10N | 50.7 | 40.3 | 9.0 |
| 7I | 53.9 | 42.9 | 3.2 |
| 2B | 62.6 | 30.6 | 6.8 |
| R | 66.6 | 16.7 | 16.7 |
| 5G | 68 | 20 | 12 |

In addition the preferred compositions for a chewing gum base as set forth earlier in this specification, namely:

Per cent by weight of the composition

Polyvinyl ester _____ About 25 to 35
Wax _____ About 15 to 30
Rubber _____ About 3 to 12 are also shown as the zone abcdefa. In plotting this zone it is observed that the percentage data given above refers to the total composition whereas the graph refers only to the essential constituents. The limits of the zone are therefore set up by noting the maximum and minimum ratios of rubber to wax namely 12/15 and 3/30. These ratios determine the lines fa and dc. Similarly, the maximum and minimum ratios of polyvinyl ester to rubber, namely 35/3 and 25/12, determine the lines cb and ef, and the ratios of polyvinyl ester to wax determine the lines ab and cd, which complete the boundaries of the zone.

DEFINITIONS

The following definitions are given to supplement the foregoing description.

The "standard mix" for a chewing gum base referred to in the specification is a mix of the proportions given in Example 3C. This mix has been used as a reference point in describing the effect of varying the amounts of the different constituents.

*Homogeneous.*—In the sense of the present invention a mixture is said to be homogeneous where there is little or no tendency of the discrete particles to layer out, as for instance, would occur at a relatively high ratio of wax to resin were no blending agent present. It should be explained that up to a certain amount, in the case of polyvinyl acetate up to about 10% paraffin wax and the resin may be formed into a homogeneous mixture without the use of a blending agent. Above this amount the wax and the resin are normaly incompatible.

The term "Butyl rubber" is intended to identify the material known in the trade as such. The nature of this material is defined by the "Plastics Year Book, 1944," as "a copolymer of isobutylene with small amounts of other polymerizable substances such as isoprene or butadiene."

*Viscosity.*—The polyvinyl ester viscosities mentioned are as measured at 20° C. in a benzene solution containing the simple gram molecular weight of polyvinyl ester per litre of solution.

*Chewability.*—This is a difficult factor to assay since it depends on the stimulation by the composition of the sensitive tissues of the tongue and mouth. The applicant has, however, made comparative chewing tests, comparing chewing gum made from his base with various commercial products. The applicant has employed the following terms to indicate progressively the range of chewability, "very very soft," "very soft," "soft," "medium," "slightly tough," "tough," "very tough," "hard and spongy" and "too hard." Chewing gums now on the market conform to one or other of these ratings.

*Pull.*—This characteristic is judged by pulling out to the breaking point a wad of well masticated chewing gum into a string. "Very long" stretches to about 1 yard or more, "long" stretches to about 2 feet, "fair" stretches about 1 foot, "short" little or no stretch before breaking. Commercial gums have been found to conform to each one of these ratings.

*Elasticity.*—This characteristic is judged by forming the chewed wad into a rod of about 1 inch long, twisting this rod several times into a spiral and noting the tendency to unwind, or alternatively by stretching the rod and noting the rate of comeback or snap. The ratings are "very elastic," "elastic," "medium," "some elasticity" and "no elasticity." Commercial gums have been found to conform to these ratings.

It will be understood that, without departing from the spirit of the invention or the scope of the claims, various modifications may be made in the specific data given. The latter are illustrative only and not offered in a restricting sense, it being desired that only such limitations shall be placed thereon as may be required by the state of the prior art or are set forth in the accompanying claims.

The sub-titles used throughout the specification are merely to simplify reference thereto and should otherwise be disregarded.

I claim:

1. A composition of matter comprising an intimate mixture containing as essential constituents polyvinyl ester resin, a wax selected from the group consisting of paraffin, candelilla, beeswax and carnauba, and a rubbery substance selected from the group consisting of Hevea rubber and a rubbery co-polymer of a major amount of isobutylene and a minor amount of isoprene, the resin content being within the range from about 10% to about 80% by weight of the composition, the wax content being an amount normally incompatible with the resin and within the range from about 10% to about 65% by weight of the composition, the content of rubbery substance being an amount less than either of the other essential constituents and effective to render the resin and wax compatible and within the range from about 2% to about 25% by weight of the composition, a non-toxic plasticizer for the polyvinyl ester within the range from about 5% to about 25% by weight of the composition, a non-toxic oil softener for the rubber up to about 6% by weight of the composition, and a non-toxic filler up to about 40% of the composition.

2. A chewing gum composition comprising an intimate mixture containing as essential constituents polyvinyl acetate resin, a wax selected from the group consisting of paraffin, candelilla, beeswax and carnauba and a rubbery substance selected from the group consisting of Hevea rubber and a rubbery co-polymer of a major amount of isobutylene and a minor amount of isoprene, the resin content being within the range from about 10% to about 60% by weight of the composition, the wax content being an amount normally incompatible with the resin and within the range from about 10% to about 45% by weight of the composition, the content of rubbery substance being an amount less than either of the other essential constituents and effective to render the resin and wax compatible and within the range from about 2% to about 25% by weight of the composition, a non-toxic plasticizer for the polyvinyl acetate within the range from about 5% to about 25% by weight of the total composition, a non-toxic plasticizer for the rubber up to about 10% by weight of the total composition, and a non-toxic filler with the range from about 6% to about 37% by weight of the total composition.

3. A chewing gum composition comprising an intimate mixture containing as essential constituents polyvinyl acetate resin, a wax selected from the group consisting of paraffin, candelilla, beeswax and carnauba and a rubbery substance selected from the group consisting of Hevea rubber and a rubbery co-polymer of a major amount of isobutylene and a minor amount of isoprene, the resin content being within the range from about 25% to about 35% by weight of the composition, the wax content being an amount normally incompatible with the resin and within the range from about 15% to about 30% by weight of the composition, the content of rubbery substance being an amount less than either of the other essential constituents, effective to render the resin and wax compatible and within the range from about 3% to about 12% by weight of the composition.

4. A composition of matter, according to claim 1, wherein the rubbery substance is Hevea rubber.

5. A composition of matter, according to claim 1, wherein the rubbery substance is a rubbery co-polymer of a major amount of isobutylene and a minor amount of isoprene.

6. A chewing gum composition, according to claim 2, wherein the rubbery substance is Hevea rubber.

7. A chewing gum composition, according to claim 2, wherein the rubbery substance is a rubbery co-polymer of a major amount of isobutylene and a minor amount of isoprene.

8. A chewing gum composition, according to claim 3, wherein the rubbery substance is Hevea rubber.

9. A chewing gum composition, according to claim 3, wherein the rubbery substance is a rubbery co-polymer of a major amount of isobutylene and a minor amount of isoprene.

10. A composition of matter, according to claim 1, wherein the polyvinyl ester resin is a polyvinyl acetate having a viscosity within the range from about 1 to about 25 centipoises.

11. A chewing gum composition, according to claim 2, wherein the polyvinyl ester resin is a polyvinyl acetate having a viscosity within the range from about 1.5 to about 10 centipoises.

12. A chewing gum composition, according to claim 3, wherein the polyvinyl ester resin is a polyvinyl acetate having a viscosity within the range from about 1.5 to about 10 centipoises.

13. A chewing gum composition, comprising, an intimate mixture containing as essential constituents a polyvinyl acetate resin having a viscosity within the range from about 1.5 to about 10 centipoises, a non-toxic substantially tasteless wax selected from the group consisting of paraffin, candelilla, beeswax and carnauba, and Hevea rubber; the resin content being within the range from about 25% to about 35% by weight of the composition, the wax content being an amount normally incompatible with the resin and within the range from about 10% to about 45% by weight of the composition, the rubber content being an amount less than that of either of the other essential constituents, effective to render the resin and wax compatible and within the range from about 2% to about 10% by weight of the composition; a non-toxic plasticizer for the polyvinyl acetate within the range from about 5% to about 25% by weight of the total composition, a non-toxic plasticizer for the rubber up to about 10% of the total composition, and a non-toxic filler within the range from about 6% to about 37% by weight of the composition.

14. A chewing gum composition, comprising, an intimate mixture containing as essential constituents a polyvinyl acetate resin having a viscosity within the range from about 1.5 to about 10 centipoises, a non-toxic substantially tasteless wax selected from the group consisting of paraffin, candelilla, beeswax and carnauba, and a rubbery co-polymer of a major amount of isobutylene and a minor amount of isoprene; the resin content being within the range from about 25% to about 35% by weight of the composition, the wax content being an amount normally incompatible with the resin and within the range from about 10% to about 45% by weight of the composition, the content of rubbery substance being an amount less than that of either of the other essential constituents, effective to render the resin and wax compatible and within the range from about 6% to about 12% by weight of the composition; a non-toxic plasticizer for the polyvinyl acetate within the range from about 5% to about 25% by weight of the total composition, a non-toxic plasticizer for the rubber up to about 10% of the total composition, and a non-toxic filler within the range from about 6% to about 37% by weight of the composition.

15. A process of rendering polyvinyl acetate resin and wax compatible in a normally incompatible mixture thereof, comprising, admixing at a softening temperature within the range from about 120° C. to about 170° C., a wax selected from the group consisting of paraffin, candelilla, beeswax and carnauba with a rubbery substance selected from the group consisting of Hevea rubber and a rubbery co-polymer of a major amount of isobutylene and a minor amount of isoprene to form a homogeneous mass, then adding the polyvinyl acetate to said mass and mixing the resultant mass at a softening temperature within the range from about 120° C. to about 170° C. until it becomes homogeneous; the amount of rubbery substance added being less than that of either the resin or the wax and effective to render the resin and wax compatible and within the range from about 2% to about 25% by weight of the composition.

16. A process, according to claim 15, including, adding a rubber plasticizing agent with the rubbery substance, and adding a plasticizer for the resin with the latter.

GEORGE JAMES MANSON.